United States Patent [19]
Tauscher et al.

[11] Patent Number: 5,129,389
[45] Date of Patent: Jul. 14, 1992

[54] BREATHING MASK SUPPLY TUBE RELEASE

[75] Inventors: Kurt Tauscher, Costa Mesa; Daniel H. Meggs, Yorba Linda; Douglas G. Scheid, Orange, all of Calif.

[73] Assignee: Wickes Manufacturing Company, Southfield, Mich.

[21] Appl. No.: 603,922

[22] Filed: Oct. 26, 1990

[51] Int. Cl.⁵ .............................. A62B 9/04
[52] U.S. Cl. .................... 128/202.27; 128/202.11; 128/912; 24/602
[58] Field of Search ............ 128/202.27, 202.11, 128/912; 24/602–607; 285/1, 2, 33, 304

[56] References Cited

U.S. PATENT DOCUMENTS

| | | | |
|---|---|---|---|
| 2,450,446 | 10/1948 | Rupp | 285/304 |
| 2,482,292 | 9/1949 | Sabbia | 285/33 |
| 4,099,818 | 7/1978 | Meinzer | 24/602 |
| 4,111,197 | 9/1978 | Warncke et al. | 128/142.4 |
| 4,559,939 | 12/1985 | Levine et al. | 128/202.27 |
| 4,619,255 | 10/1986 | Spinosa et al. | 128/202.27 |
| 4,793,342 | 12/1988 | Haber et al. | 128/202.27 |
| 4,803,980 | 2/1989 | Nowakowski et al. | 128/201.23 |
| 4,841,953 | 6/1989 | Dodrill | 128/202.27 |
| 4,869,245 | 9/1989 | Nowakowski et al. | 128/201.23 |

Primary Examiner—Edgar S. Burr
Assistant Examiner—Aaron J. Lewis
Attorney, Agent, or Firm—David A. Greenlee

[57] ABSTRACT

A release comprises cylindrical first and second connectors having supply passages, one of which is mounted on the supply tube and the other of which is mounted on the mask. The first connector has a cylindrical chamber for receiving a cylindrical portion of the second connector to connect the connectors and operatively connect the tube to the mask to enable supply of breathing gas to the mask. The second connector has a groove formed in its outer surface for receiving a split spring ring carried by the first connector. The free ends of the arms of the split ring have cam surfaces. A spring is mounted on the second connector and is compressed by insertion of the second connector. An unlocking device comprises an electrically-actuated explosive device carried within the first connector and a wedge which is projected against the cam surfaces upon actuation to force the spring arms apart, to force the split ring out of the groove. This unlocks the couplings which are forced apart by the spring, connecting the mask wearer to ambient atmosphere through the mask supply passage.

12 Claims, 2 Drawing Sheets

BREATHING MASK SUPPLY TUBE RELEASE

FIELD OF THE INVENTION

This invention relates generally to breathing masks and, more particularly, to a device for releasing a supply tube from a breathing mask to open the mask to ambient atmosphere.

BACKGROUND OF THE INVENTION

Pilots and other aircrew members are normally provided with a breathing mask, commonly called an oxygen mask, which is mounted on a protective helmet. The breathing mask is supplied with a pressurized supply of breathing gas, carried by the aircraft, through a supply tube. This arrangement enables the aircrew to function at altitudes where the ambient atmosphere is too "thin" to provide an adequate supply of oxygen to permit human functioning.

The supply tube usually has a coupling for attachment to an aircraft supply port. This coupling is automatically disconnected upon ejection of the aircrew during an aircraft emergency. Thus the aircrew member is ejected with a length of supply hose dangling from the mask.

If the ejection results in descent into a body of water, it is conventional for the aircrewman to remove the mask to prevent submersion of the dangling tube end into the water, thus enabling breathing of the ambient air or atmosphere. If the person is unconscious, injured or otherwise unable to manually release the mask, drowning will ensue due to oxygen deprivation or water inhalation.

It is thus necessary to automatically remove the mask to prevent drowning of an unconscious person wearing the mask.

U.S. Pat. Nos. 4,803,980 and 4,869,245 to Nowakowski et al both disclose explosive devices for disconnecting a mask from a helmet in response to an electrical signal generated by immersion of a detector in water. Arrangements of this type prevent drowning of the mask wearer due to immersion of the supply tube in water and are adequate for that purpose.

However, there are certain circumstances where a mask release is inadequate to provide breathing access for the mask wearer and prevent drowning. In one application, the mask is attached to a chemical defense hood that is worn by the aircrewman beneath the helmet and is attached to the helmet. In this instance, any release of the mask from the helmet does not remove the mask from the wearer, since it remains attached to the hood that is trapped beneath the helmet.

It is therefore desirable to provide a device which automatically provides breathing access to ambient atmosphere for the wearer of a helmet-mounted breathing mask while leaving the mask attached to the helmet.

SUMMARY OF THE INVENTION

It is an object of this invention to provide a device for automatically providing access to ambient atmosphere for the wearer of a helmet-mounted breathing mask while leaving the mask attached to the helmet.

In accordance with this invention, a release is provided for releasing a supply tube from a breathing mask which comprises a first connector mounted on the supply tube and having a supply passage, a second connector mounted on the mask and having a supply passage, the connectors interfitting to operatively connect the tube tothe mask by connecting the supply passages and a locking device having a locked position maintaining the first and second connectors connected and an unlocked position disconnecting the first and second connectors. The release includes an unlocking means to move the locking device to its unlocked position and biasing means for positively separating the first and second connectors when unlocked to open the mask supply passage to ambient atmosphere.

In a preferred embodiment, the release comprises first and second connectors having supply passages, one of which is mounted on the supply tube and the other of which is mounted on the mask. The first connector has a cylindrical chamber for receiving a cylindrical portion of the second connector to connect the connectors and operatively connect the tube to the mask to enable supply of breathing gas to the mask. The second connector has a groove formed in its outer surface for receiving a split ring carried by the first connector. The split ring is formed of spring material and has a normal unstressed position occupying the groove. A spring is mounted in the first connector and is compressed by insertion of the second connector. An unlocking device comprises an electrically-actuated explosive device carried within the first connector and a conical plunger which is projected upon actuation against the cam surfaces to force the free ends of the split ring apart, expanding the split ring out of the groove. This unlocks the couplings which are forced apart by the spring, connecting the mask wearer to ambient atmosphere through the mask supply passage.

Thus a release according to this invention provides for the positive release of the supply tube from the breathing mask while leaving the mask attached to the helmet. It also provides a release which is independent of the manual mask-to-helmet connector.

These and further features of this invention are further explained in the following detailed description of the invention as illustrated in the attached drawings, in which:

DETAILED DESCRIPTION OF THE INVENTION

Figure 1:
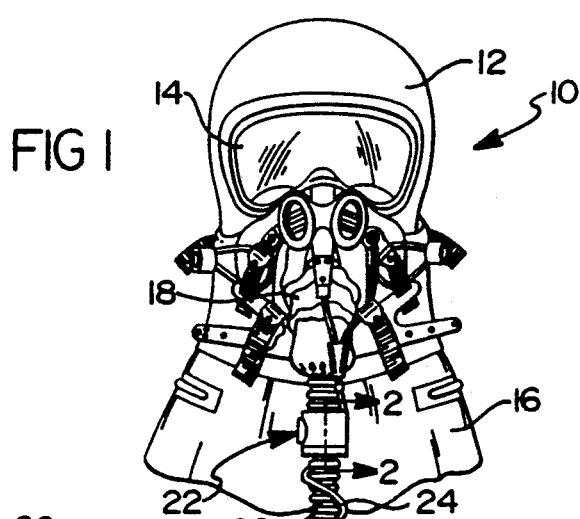
FIG. 1 is a front elevation of an aircrew eye respiratory protective system in which the helmet is provided with an attached breathing mask and supply tube which incorporates a tube release according to this invention.

Referring now to FIG. 1 of the drawings, an aircrew eye respiratory protection (AERP) system 10 is provided for protecting an aircrewman from injury due to exposure to chemical and biological warfare agents.

The AERP includes a protective hard helmet 12 having a protective face visor 14 and an underlying hood 16.

A breathing, or oxygen mask, 18 is mounted to the hood for supplying breathing gas to the mask wearer through a supply tube 20 which is conventionally connected at its other end (not shown) to a supply port mounted in an aircraft. This mask 18 is sealed to the hood 16 to enable the supply of breathing gas which is required at high altitudes where the atmosphere is too "thin" to provide sufficient oxygen to enable the wearer to function. The secure supply of breathing gas is also required during a chemical or biological warfare attack to enable exclusion of toxic ambient air from the wearers breathing process.

The supply tube incorporates a release coupling 22, for a purpose to be described later, and has a communication wire assembly 24 loosely wound around it. The communication wire assembly 24 extends from inside the mask 18 to a connector (not shown) in the aircraft to conventionally provide the wearer with a communication link.

In the event of an aircraft malfunction requiring the aircrew to exit the aircraft, the connections of the breathing gas supply tube 20 and the wire assembly 24 to the aircraft are automatically disconnected by conventional means as the aircrewman is ejected from the aircraft. Subsequent breathing of the aircrewman is from ambient atmosphere through now-open end (not shown) of breathing gas supply tube 20.

The aircrewman is easily supplied with ambient air, which will contain sufficient oxygen, upon descent to earth. This arrangement is adequate to assure oxygen supply to the aircrewman, whether conscious or unconscious, so long as the descent is to dry land. However, the situation changes dramatically should the descent be into a watery environment, such as an ocean or a lake.

In this case, the dangling free end of the supply tube 20 will become immersed in water due to gravity. If the aircrewman is conscious, he can merely remove the helmet and hood from his head and breathe the ambient air. This maneuver is not possible if the aircrewman is unconscious. The unfortunate result in this case is that the free end of tube 20 will become immersed in the water and the aircrewman will suffocate or drown via inhalation of water, unless other provisions are made to assure a supply of breathable gas.

Figure 2:
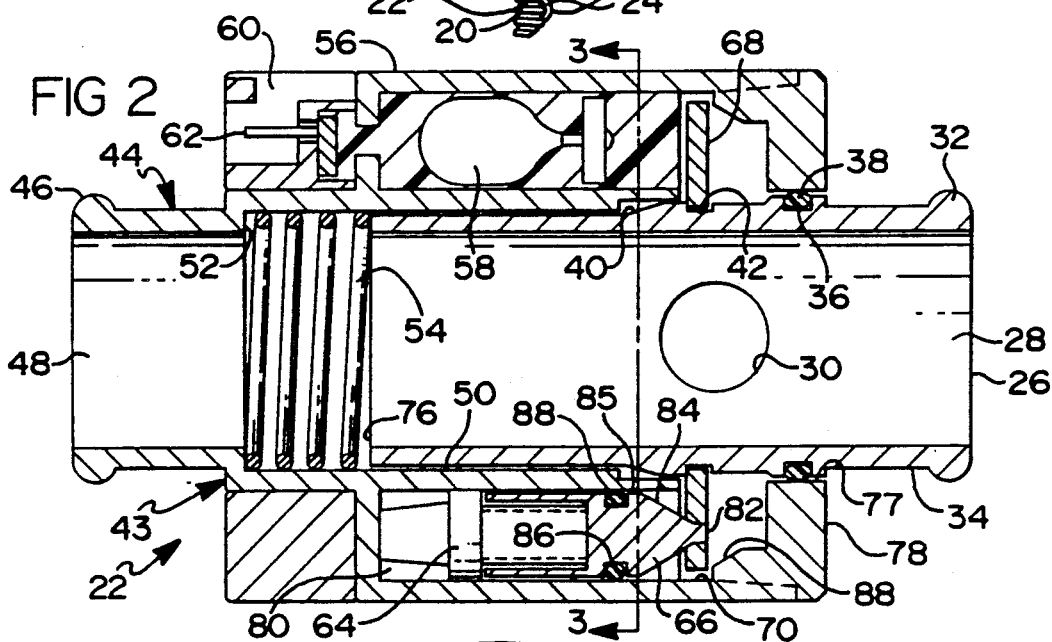
FIG. 2 is sectional view of the tube release, taken along line 2—2 of FIG. 1, according to the invention, illustrating its component parts.

To assure breathing access to the ambient atmosphere, supply tube 20 incorporates releasable coupling 22, which will now be described with reference to FIGS. 2-4. Coupling 22 includes a cylindrical inner member or connector 26 having a supply passage 28 that includes large radial holes 30, only one of which is shown. The outer end of member 26 includes a shoulder 32 for conventional clamping attachment (not shown) to the mask 18 or to the mask-end portion 20a of tube 20.

Intermediate its ends, the outer surface 34 of member 26 includes a pair of spaced shoulders defining an annular groove 36 that receives an O-ring 38. Further inward, outer surface 34 incorporates a conical camming surface 40 that terminates in another annular groove 42.

The outer member or connector 43 of coupling 22 has a cylindrical outer end 44 which terminates in an annular shoulder 46 for attachment to the remote end 20b of tube 20 by conventional clamping means (not shown). A cylindrical supply passage 48 opens into an enlarged chamber 50 at annular shoulder 52, which slidingly receives the inner end, or nozzle, 54 of member 26.

Outwardly of chamber 50, member 43 has an outer casing 56 that houses a potted circuit board 58. Mounted at the outer end of casing 56 is a member 60, which has circumferentially-spaced open chambers that house a plurality of electrical contacts 62. The casing 56 houses an explosive squib 64 for operating a decoupling actuator 66.

Figure 5:
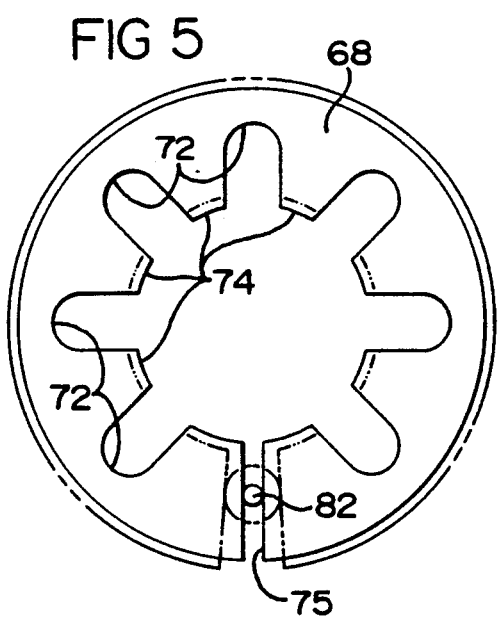
FIG. 5 is a detail view of a preferred embodiment of a coupling locking device and unlocking device, according to this invention, illustrating the locked and unlocked positions.

A split spring locking ring 68 is confined in an enlarged annular groove 70. As best shown in FIG. 5, locking ring 68 contains a plurality of circumferentially-spaced notches 72 which define inwardly depending locking fingers 74. Ring 68 is split radially to provide a slot 75 in ring 68. As illustrated in FIG. 3, the outside diameter of ring 68 is smaller than the inside diameter of groove 70, while fingers 74 extend sufficiently into groove 42 to lock inner member 26 to outer member 43. In the locked condition of FIG. 2, a coil spring 76 is compressed between inner member end 54 and the shoulder 52 of chamber 50. O-ring 38 is compressed to provide a seal between groove 36 and the surface defining an aperture 77 in an annular flange 78 carried by outer member 43.

Casing 56 contains a cylindrical satellite chamber 80 which houses squib 64 and decoupling actuator 66. Actuator 66 has a central nose 82 sized to fit within slot 75 in its unstressed state, as shown in FIG. 5. From nose 82, a conical camming surface 84 extends rearwardly and outwardly to an outer shoulder 85 and an annular groove 86 which houses an O-ring that seals against the annular wall of chamber 80. Axially outwardly of groove 70, outer member 43 includes a compound stop surface 88 that is profiled to match the nose 82 and camming surface 84 of actuator 66.

Figure 3:
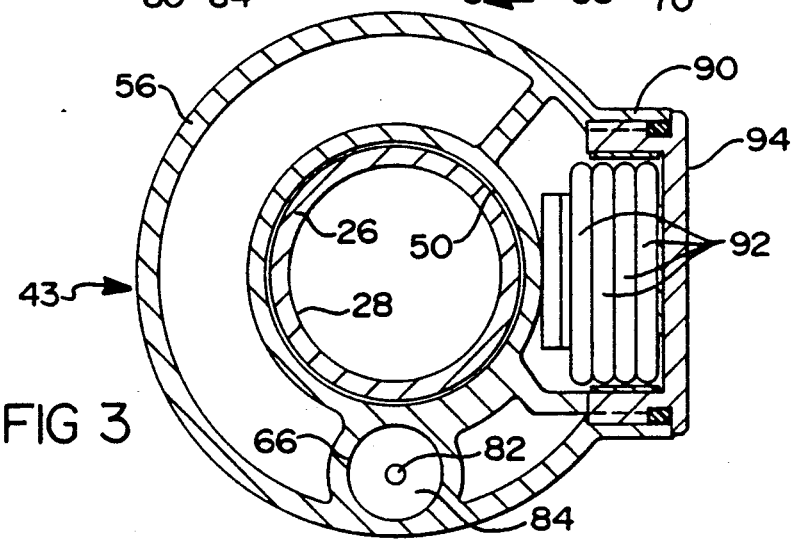
FIG. 3 is a sectional view of the tube release, taken along line 3—3 of FIG. 2, according to this invention.
Figure 4:
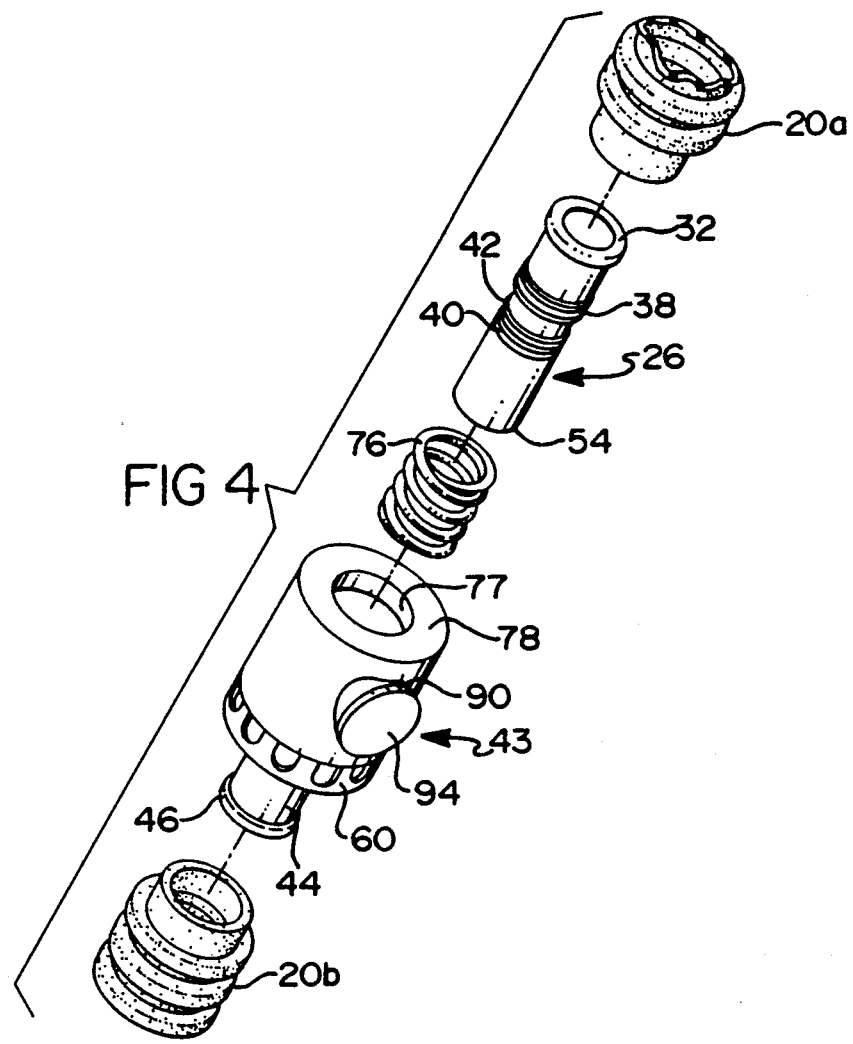
FIG. 4 is an exploded perspective view of the release, showing the major components of the couplings, according to this invention.

As shown in FIG. 3, casing 56 includes a radially-extending annular battery chamber 90 which houses a stack of conventional wafer batteries 92 and is closed by a cap 94. Batteries 92, contacts 62, circuit board 58 and squib 64 are conventionally electrically interconnected so that completion of a circuit by connecting contacts 62 will provide an electrical charge to fire squib 64.

Operation will now be described. Coupling 22 is assembled by inserting nozzle 54 through the aperture 77 to engage and begin compressing spring 76. Camming surface 40 will engage fingers 74 and expand spring split ring 68 outwardly into groove 70 until O-ring 38 enters and sealingly engages the periphery of aperture 77. Then spring fingers 74 will register with and enter groove 42 to lock members 26 and 43 together, with spring 76 compressed. The sections 22a and 22b are now operatively connected to enable the supply of breathing gas through coupled passages 28 and 48, which are sealed by O-ring 38, to mask 18. A substantial compressive force is stored in spring 68.

Should the aircrewman be forced to eject from his aircraft and descend into water, coupling 22 will automatically separate as follows. When contacts 62 are immersed in water, an electrical circuit will be completed and squib 64 will fire in a well-known manner.

The explosive force provided by the firing of squib will drive actuator 66 further into slot 75. Conical camming surface 84 will expand split ring 68 outwardly into groove 70. This expansion continues until the motion of actuator 66 is stopped by engagement with stop surface 88. The inner diameter of the fingers 74 of the expanded ring 68 is now larger than the outside diameter of inner member 26.

This expanded condition of the split ring 68 is maintained by the cylindrical surface of actuator shoulder 85 which is wedged into slot 75, as shown in phantom lines in FIG. 5. This enables spring 76 to forcefully expel inner member 26 from outer member 43, thus separating coupling 22 and enabling the supply of ambient air to mask 18 through the end of nozzle 54 and radial holes 30.

Figure 6:
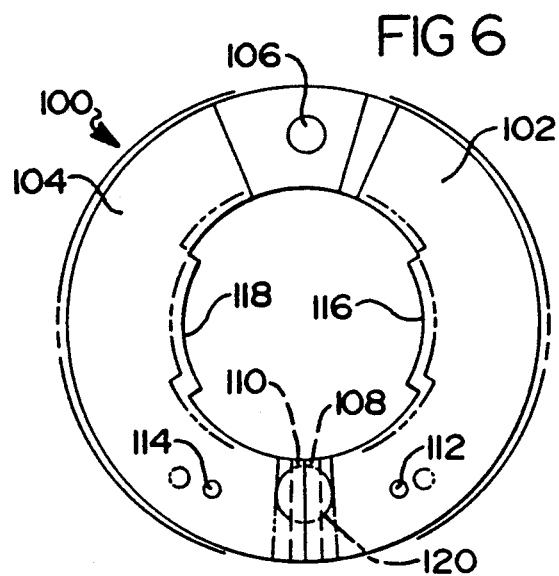
FIG. 6 is a view similar to FIG. 5, illustrating another embodiment of the locking and unlocking device.

FIG. 6 illustrates an alternate to the split spring ring previously described. In this embodiment a split ring 100 would have the same outer ind inner dimensions so as to directly replace split ring 68. Split ring 100 comprises a pair of arms 102 and 104 that are pivoted together by a pin 106. Opposite pivot pin 106, the arms 102 and 104 terminate in respective chamfered surfaces 108 and 110 to form an axially converging, radially extending "V". The arms are aperture adjacent these chamfered surfaces to receive shear pins 112 and 114 that would be carried in mating apertures in casing 56 adjacent slot 70 to close the split in ring 100.

Nozzle 54 would be inserted in chamber 50 and then pins 112 and 114 would be inserted to maintain engagement of locking tabs 116 and 118 in groove 42. An actuating member shaped like member 66 could be used, but, preferably, a ball 120 would utilized.

Firing of squib 64 would drive ball 120 against chamfered surfaces 108, 110 and drive arms 102 and 104 apart, shearing pins 112 and 114 in the process. Thereafter, spring 76 would expel inner member 26, separating coupling 22 as described above.

Thus, this invention provides a coupling for a breathing mask supply hose that automatically separates upon water contact to enable the supply of ambient air to the mask.

I claim:

1. In a breathing mask having a supply tube, a release for releasing the supply tube from the breathing mask comprising:
   a first connector mounted on the supply tube and having a supply passage,
   a second connector mounted on the mask and having a supply passage, the connectors interfitting to connect the supply passages and operatively connect the supply tube to the mask,
   a locking device having a locked position maintaining the first and second connectors connected and an unlocked position disconnecting the first and second connectors,
   unlocking means, excluding a power-operated actuator for moving the locking device to its unlocked position, and biasing means for positively separating the first and second connectors when unlocked to open the mask supply passage to ambient atmosphere.

2. The release of claim 1, wherein one of the first and second connectors has a central chamber for receiving the other connector to operatively connect the tube to the mask, one of the connectors carrying the locking device, and the other connector having an abutment engaged by the locking device when the connectors are connected to maintain the connectors locked together.

3. The release of claim 2, wherein the biasing means is compressed by insertion of the other connector into the chamber.

4. The release of claim 3, wherein the other connector carries the abutment, the locking device carried by the one connector comprises a split ring having free ends and a latch securing the free ends together to engage the abutments, and the unlocking means includes an actuator for unlatching the latch by forcing the free ends apart to unlock the connectors and enable the biasing means to separate the connectors.

5. The release of claim 3, wherein the other connector carries the abutment, the locking device carried by the one connector comprises a split ring of spring material having free ends having a normal position engaging the abutments, and the unlocking means includes an actuator for forcing the free ends apart and out of engagement with the abutments to unlock the connectors and enable the biasing means to separate the connectors.

6. In a breathing mask having a supply tube, a release for releasing the supply tube from the breathing mask comprising:
   a first connector mounted on the supply tube and a second connector mounted on the mask,
   the first connector having a chamber for receiving the second connector to operatively connect the tube to the mask,
   an abutment carried by the second connector,
   a locking device carried by the first connector for movement between positions engaging and disengaging the abutment to lock and unlock the connectors,
   a power actuator unlocking device actuatable to unlatch and disengage the locking device from the abutment to unlock the connectors and disconnect the tube from the mask.

7. The release of claim 6, wherein the first connector chamber is cylindrical, the second connector has a cylindrical portion insertable into the chamber, the abutment comprises a groove formed in the second connector exterior surface, the locking device includes a spring arm movable into and out of the groove, and the power actuator is actuatable to engage the arm to force the arm out of the groove to unlock the connectors.

8. The release of claim 7, including a spring member carried by the first connector which is compressed by insertion of the second connector into the chamber, the spring member serving to expel the second connector from the chamber upon movement of the arm out of the groove to positively disconnect the tube from the mask.

9. The release of claim 8, wherein the locking device comprises a split spring ring having two free ends and having a normal unstressed position in the groove, the free ends including cam surfaces, and the actuator including a wedge portion which is driven against the cam surfaces to force the free ends apart.

10. The release of claim 9, including a peripheral seal between the first connector outer surface and the chamber inner surface to isolate the supply passages from ambient conditions when the connectors are connected.

11. In a breathing mask having a supply tube, a release for releasing the supply tube from the breathing mask comprising:
   first and second connectors having supply passages, one of which is mounted on the supply tube and the other of which is mounted on the mask, the first connector having a cylindrical chamber for receiving a cylindrical portion of the second connector to connect the connectors and operatively connect the tube to the mask to enable supply of breathing gas to the mask,
   a locking ring carried by the first connector and having two interconnected arms each having a cam surface at its free end,
   a groove formed in the outer surface of the second connector for receiving the arms to lock the connectors together;

a spring mounted on the first connector for compression by the second connector upon insertion;

an unlocking device comprising an electrically-actuated explosive device carried within the first connector and a wedge, the wedge being projected upon actuation against the cam surfaces to force the arms apart to unlock the couplings to enable the spring to force the connectors apart and connect the mask supply passage to ambient atmosphere.

12. In a breathing mask having a supply tube, a release for releasing the supply tube from the breathing mask comprising:

a first connector and a second connector, one of which is mounted on the supply tube and the other of which is mounted on the mask, the first connector having a chamber for receiving the second connector to operatively connect the tube to the mask, an abutment carried by the second connector, a locking device carried by the first connector for movement between positions engaging and disengaging the abutment to lock and unlock the connectors, a frangible pin latching the locking device in engagement with the abutment, and an unlocking device actuatable to fracture the pin to unlatch and disengage the locking device from the abutment to unlock the connectors and disconnect the tube from the mask.

* * * * *

UNITED STATES PATENT AND TRADEMARK OFFICE
CERTIFICATE OF CORRECTION

PATENT NO. : 5,129,389

DATED : 7/14/92

INVENTOR(S) : Kurt Tauscher, et al

It is certified that error appears in the above-indentified patent and that said Letters Patent is hereby corrected as shown below:

Col. 5, line 47, "unlocking means, excluding a power-operated actuator" should read --unlocking means, including a power- operated actuator--.

Signed and Sealed this

Seventh Day of September, 1993

Attest:

BRUCE LEHMAN

Attesting Officer     Commissioner of Patents and Trademarks